United States Patent [19]

Lange

[11] 4,395,104
[45] Jul. 26, 1983

[54] ELECTRICALLY PROGRAMMED SHUTTER ASSEMBLY

[75] Inventor: Karl-Heinz Lange, Bunde, Fed. Rep. of Germany

[73] Assignee: Balda-Werke Photographische Gerate und Kunststoff GmbH & Co., KG, Bunde, Fed. Rep. of Germany

[21] Appl. No.: 301,339

[22] Filed: Sep. 11, 1981

[30] Foreign Application Priority Data

Sep. 11, 1980 [DE] Fed. Rep. of Germany ....... 3034214

[51] Int. Cl.³ .............................................. G03B 9/24
[52] U.S. Cl. .................................................. 354/230
[58] Field of Search ..................... 354/26, 29, 30, 230, 354/231

[56] References Cited

U.S. PATENT DOCUMENTS 4,107,705 8/1978 Hashimoto et al. ............ 354/230 X

Primary Examiner—John Gonzales
Attorney, Agent, or Firm—Blum, Kaplan, Friedman, Silberman & Beran

[57] ABSTRACT

An electronically programmed shutter assembly for a camera including an opening ring and a closing ring with locking shutter blades activated by rotation of the rings is provided. The locking ring is held in position upon rotation of the opening ring by a holding member attached to a holding magnet. The holding member is prevented from releasing the closing ring until the opening ring has travelled a minimum distance and the holding magnet has been demagnetized in order to insure attainment of a minimal lens opening prior to closing of the shutter blades. Insuring minimal lens opening will prevent the closing ring from closing the shutter immediately upon activation of the opening ring under intensive lighting conditions.

8 Claims, 5 Drawing Figures

ELECTRICALLY PROGRAMMED SHUTTER ASSEMBLY

BACKGROUND OF THE INVENTION

This invention relates to an electrically programmed shutter assembly, and more particularly to a shutter assembly including an opening ring and a closing ring wherein the closing ring is prevented from closing the shutter blades prior to attainment of a minimal lens opening.

The shutter blades of programmed shutters overlap a predetermined amount when a locked positioned. Thus, there is a time interval from the start of the opening movement of the shutter blades by rotation of the opening ring until a minimal lens opening occurs. In electrically programmed shutter assemblies, under intensive lighting conditions, the situation can arise that no light will pass through the shutter, dispite having released the shutter button. This may occur, when the camera is utilized in intensive illumination and the holding magnet retaining the closing ring releases the closing ring as soon as the opening ring has started to move. In these cases, the user will not be aware that he has missed a shot so that loss of exposure is doubly annoying.

Accordingly, it would be desirable to provide a programmed shutter of the conventional type wherein it is possible to insure that a predetermined minimal opening of the shutter blades occurs, independent of illumination striking the camera and metering mechanisms.

SUMMARY OF THE INVENTION

Generally speaking, in accordance with the invention, an electrically programmed shutter assembly including an opening ring and a closing ring is provided. Oscillatable shutter blades are mounted on stationary pins on the opening ring and include slits for receiving a stationary pin mounted on the closing ring in the usual fashion. The rings are biased in a first rotational direction and upon activation of a shutter release key, the opening ring begins to rotate for opening the shutter blades. The closing ring is maintained in its cocked position by an electromagnet until a signal releases the electromagnet and permits the closing ring to follow the opening ring for closing the shutter blades.

Under intense lighting conditions, the closing ring can begin to close in response to a signal from the metering mechanism as soon as the opening ring has started to rotate. Under these circumstances, due to the overlap of the shutter blades, no light can pass through the lens. In order to prevent this occurrence, a lug is provided on the opening ring for preventing the closing ring from being released from engagement by the holding magnet. The holding magnet cannot release the closing ring until the opening ring has been displaced a predetermined angular displacement to insure a minimal lens aperture. Upon the predetermined rotation of the opening ring, the closing ring is permitted to follow, thereby insuring a minimal lens opening independent of the illumination reaching the camera.

Accordingly, it is an object of the invention to provide an improved electrically programmed shutter assembly for a camera.

It is another object of the invention to provide an improved electrically programmed shutter assembly wherein the shutter is prevented from closing until a minimum lens opening is reacted.

Still another object of the invention is to provide an improved shutter assembly including an opening ring, a closing ring, shutter blades oscillatably mounted on the closing ring and a holding magnet for holding the closing ring in cocked position until the closing ring is released from magnetic engagement with the holding magnet and the shutter has reached a minimum lens opening.

It is a further object of the invention to provide an improved shutter assembly wherein the shutter is prevented from closing until a closing signal is applied and a minimal lens opening is reached.

Still a further object of the invention is to provide an improved shutter assembly wherein the closing of the shutter is inhibited until the opening member has been displaced a fixed distance to insure a minimal lens opening.

Yet another object of the invention is to provide an improved electrically programmed shutter assembly for a camera wherein a minimal lens opening is insured independent of illumination reaching the camera.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
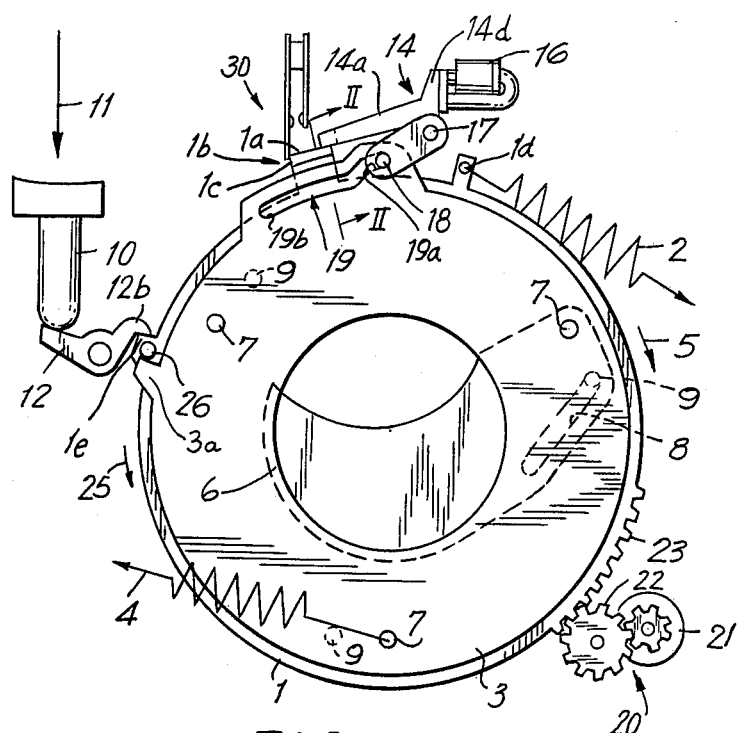
FIG. 1 is an elevational view, in schematic, representing a shutter assembly constructed and arranged in accordance with the invention.
Figure 2:
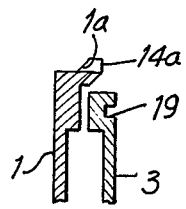
FIG. 2 is a partial cross-sectional view of the shutter assembly taken along line II—II of FIG. 1.

The shutter assembly constructed and arranged in accordance with the invention includes an opening ring 1 biased in a clockwise direction by a tension spring 2 mounted on a lug 1d and secured to the camera wall (not shown). A tension spring 4 is mounted between a locking (or closing) ring 3 and the camera wall for biasing closing ring 3, also in a clockwise direction. Thus, tension springs 2 and 4 tend to cause opening ring 1 and locking ring 2, respectively, to rotate in a clockwise direction shown by an arrow 5.

The shutter assembly illustrated includes three shutter blades 6, only one of which is shown in the drawings. Shutter blade 6 are oscillatably mounted on three storage pins 7 fixedly mounted on closing ring 3. Each shutter blade 6 includes an elongated slit 8 which runs obliquely towards the lens axis at the center of the shutter assembly. Each slit 8 is traversed by a pin 9 mounted on opening ring 1.

The shutter assembly is operated by pressing down on a shutter release key 10 in the direction of an arrow 11. When the shutter assembly is in a cocked or tensioned position as shown in FIG. 1, a lug 1e on opening ring 1 is engaged by an engagement surface 12b on a release pawl 12. Upon depression of release key 10, pawl 12 pivots about a mounting pin 12a releasing the engagement with lug 1e and permitting opening ring 1 to rotate in a clockwise direction.

Closing ring 3 includes a lug 3a which engages a stop pin 26 on lug 1e of opening ring 1. As both opening ring 1 and locking ring 3 are biased in the same clockwise direction, closing ring 3 would tend to follow opening ring 1 upon rotation of opening ring 1 as lug 3a is no longer held in cocked position by stop pin 26. Similarly, when opening ring 1 is cocked by turning in a counter-clockwise direction of arrow 25, stop pin 26 also forces closing ring 3 in a counter-clockwise direction for placing the shutter assembly in the cocked position of FIG. 1. Closing ring 3 is maintained in the cocked position by a stop magnet assembly 14 in addition to engagement by stop pin 26.

Holding magnet assembly 14 includes a holding magnet 16 which is an electromagnet which is deenergized upon receipt of a signal (not shown) in response to ambient lighting conditions for signaling release of closing ring 3 in a manner which will be described below. Holding assembly 14 includes an elongated holding member 14a which supports a magnetic anchoring plate 15 in engagement with holding magnet 16. Holding member 14 is pivotably mounted on a stationary pin 17 and includes a side arm 14d having a pin 18 for riding in an elongated camming groove 19 on the periphery of closing ring 3. Camming groove 19 includes a cocked cam region 19a and a release cam region 19b. Cocked cam region 19a is at a larger radiuss than release cam region 19b.

Opening ring 1 is also formed with a lug 1c which protrudes into contact with holding element 14a along a contacting surface 1a. The elements of holding assembly 14 are positioned so that when the shutter is in the cocked position of FIG. 1, pin 18 rests in cocked cam region 19a, magnetic anchoring plate 15 is engaged by holding magnet 16 and holding member arm 14a is engaged with contact surface 1a of lug 1c. At the time the shutter is released by depressing release key 10, pawl 12 rotates in a counter-clockwise direction thereby releasing the engagement between engaging region 12b and lug 20 on opening ring 1. This causes opening ring 1 to rotate in the clockwise direction of arrow 5 in reaction to tension spring 2. At the same time, stop pin 26 is released from engagement from lug 3a. However, locking ring 3 does not rotate at this time as contact surface 1a of lug 1b is displaced along under the surface of holding arm 14a of holding assembly 14. Holding arm 14 continues supporting magnet anchoring plate 15 against holding magnet 16 as pin 18 remains in cocked cam region 19a. When opening ring 1 rotates a contact switch 30 is released by projection 1 for closing the timing circuit (not shown) and corresponds to time $t_0$.

Figure 3:
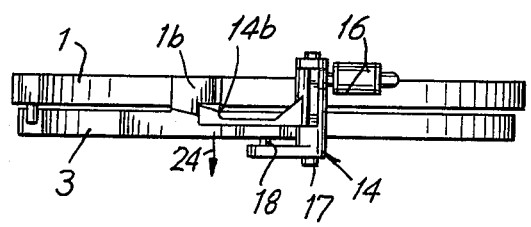
FIG. 3 is a top plan view of the shutter assembly illustrated in FIG. 1.
Figure 4:
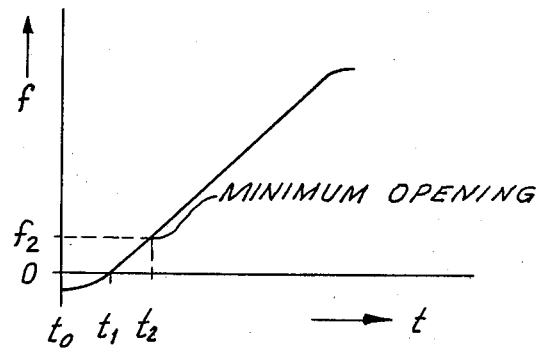
FIG. 4 is a graph illustrating lens opening with respect to time for a shutter assembly constructed and arranged in accordance with the invention.
Figure 5:
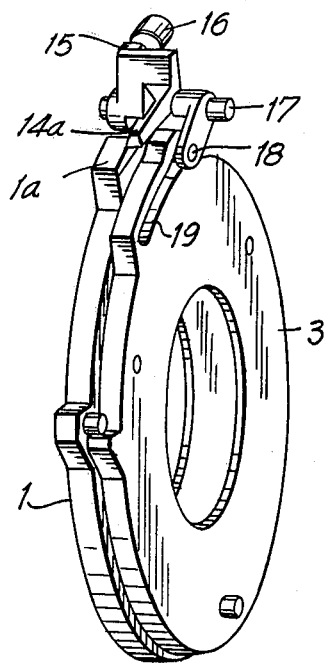
FIG. 5 is a perspective view of the shutter assembly of FIG. 1.

Generally, the magnetic attraction between anchoring plate 15 and holding magnet 16 will be released upon application of a signal to demagnetize holding magnet 16. However, when the lighting conditions trigger an electrical signal to holding magnet 16 to demagnetize it, anchoring plate 15 cannot fall off from engagement with holding magnet 16 until oblique contact surface 1a and its rear border is displaced behind border 14b of arm 14a, shown more clearly in FIG. 3. During this period of angular rotation of opening ring 1, which corresponds to a time $t_0$ to $t_2$ in the graph of FIG. 4, it is impossible for magnet anchoring plate 15 to be released from position in engagement with holding magnet 16 and for holding member 14 to pivot about pin 17. In effect, this means that the programmed shutter, under any circumstances, remains open until time $t_2$. This assures attaining a minimal lens opening of $f_2$.

After border 1c is displaced behind border 14b of holding arm 14a, magnet anchoring plate 15 may continue to attracted to holding magnet 16 or disengaged therefrom due to the electrical signal applied to the magnetized holding magnet 16. As soon as magnet anchoring plate 15 falls off from engagement with holding magnet 16, holding member 14 is rotated about stationary axis 17 in a counterclockwise direction permitting tracer pin 18 to be displaced in cam run 19. Pin 18 is displaced from outer radius of cocked shutter portion 19a towards inner radius of released cam region 19b lying on the smaller radius. Upon oscillation of holding member 14 about stationary axis 17, closing ring 3 is free to follow opening ring 1 in the clockwise direction of arrow 5 and thereby begin to close shutter blades 6.

The shutter assembly in FIG. 1 further illustrates a retard mechanism 20 which includes two cog wheels (or gear wheels) 21 and 22 which are in engagement with a tooth segment 23 on the outer surface of opening ring 1. Such a retard mechanism such as mechanism 20 is generally well known in the prior art. The rotational displacement of opening ring 1 may be controlled by retard mechanism 20 so that locking ring 3 can overtake opening ring 1 and trigger the locking movement of shutter blades 6, as desired.

In the construction of the shutter assembly in accordance with the invention, arm 14a of holding member 14 may pivot in the direction of arrow 24 transverse to the movement of opening ring 1. This transverse mobility of arm 14a is essential for permitting cocking of the shutter. At the time of tensioning of the shutter assembly, opening ring 1 is rotated in the counter-clockkwise direction of arrow 25. This rotation of opening ring 1 also rotates locking ring 3 in the same direction due to action of stop pin 26 on lug 3a. In response to this counter-clockwise rotation of opening ring 1 and locking ring 3, both tensioning springs 2 and 4 become tensioned. As this is happening, pin 18 remains in the smaller radius of release cam region 19b, and arm 14a at its rear border would impinge with the front border of lug 1c if arm 14a could not deflect transverse in arrow direction 24. Upon further tensioning in counter-clockwise direction arrow 25, pin 18 enters the larger radius of cock cam region 19a and displaces the outer range of arm 14a outwardly.

Holding arm 14a and lug 1c are formed with opposed surfaces which are oblique with respect to each other and the planar surfaces of opening ring 1 and locking ring 3. By providing these oblique surfaces, it is possible for the lower surface of arm 14a to return to contact with inclined surface 1a as the shutter rings are cocked. This occurs in a snapping movement as soon as the lower border of holding arm 14 is raised high enough by action of pin 18 and holding magnet 16 attracts anchoring plate 15 thereto.

By constructing and arranging a shutter assembly including an opening ring and a locking ring in accordance with the invention, a programmed shutter is provided which insures a predetermined minimal lens opening of the shutter blades, independent of illumination striking the camera. The construction proposed in accordance with the invention insures that a minimal opening of the shutter blades occurs under any circumstances. Thus, even if the holding magnet is demagnetized immediately as soon as the opening ring commences rotation, the demagnetization of the holding magnet will not influence the closing of the closing ring until the minimal lens opening occurs.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electrically controlled programmed shutter assembly for a camera for insuring a predetermined minimum lens opening comprising:
    an opening ring biased for rotation in a first rotational direction;
    a closing ring mounted adjacent to said opening ring and biased for rotation in the first rotational direction;
    shutter blades mounted on one of the opening and closing rings, the blades opening in response to rotation of the opening ring in the first rotational direction with respect to the closing ring and closing in response to rotation of the closing ring in the first rotational direction with response to the opening ring; and
    electromagnetic means for holding said closing ring in the first rotational direction; said opening ring including holding means restricting rotation of the closing ring until the opening ring has traveled a predetermined distance, said holding means operatively engaged with the electromagnet means for insuring a predetermined minimal opening of the shutter blades for providing a minimum lens aperature by releasing said closing ring only after said opening ring has been displaced a predetermined distance.

2. The electrically controlled programmed shutter assembly of claim 1, wherein said electromagnet means includes, a selectively energized electromagnet and said holding means includes a pivotable holding member including a magentic plate adapted to be attracted by said electromagnet when energized, said pivotable holding member holding said closing ring and permitting displacement of the closing ring when the electromagnet is deenergized; and a projection formed on the peripheral surface of the opening ring which impeds displacement of the pivotable holding member until a predetermined rotation of the opening ring for insuring a minimal shutter opening before permitting displacement of the pivotable holding member for commencing displacement of the closing ring.

3. The electrically controlled programmed shutter assembly of claim 2, wherein the closing ring further includes a camming surface having an outer camming radius and an inner camming radius, said pivotable holding member including a cam follower for engaging said camming radii, said follower engaging said outer said camming radius when said pivotable holding member is in contact with said electromagnet when the shutter assembly is in a cocked position and when the opening ring commences displacement, said cam follower being displaced to the inner camming radius upon release of the holding member from engagement with the electromagnet for permitting displacement of said closing ring when said holding member has been released by said electromagnet and the projection on said opening ring has been displaced a minimum rotation to permit rotation of the pivotable holding member, the minimum rotation of the opening ring prior to displacement of said closing ring for insuring a minimum lens opening prior to rotation of the closing ring.

4. The electrically controlled programmed shutter assembly of claim 3, further including retard means for controlling the speed of the rotating opening ring.

5. The electrically controlled programmed shutter of claim 4, wherein said retard means includes a tooth segment formed on the peripheral surface of the opening ring and at least one gear in engagement with said tooth region.

6. The electrically controlled programmed shutter assembly of claim 2, wherein said pivotable holding member includes an elongated arm for contacting the projection on said opening ring.

7. The electrically controlled programmed shutter assembly of claim 6, wherein said elongated arm and said projection each are formed with cooperating oblique surfaces for placing the holding member in contact with said electromagnet when the shutter is cocked.

8. The electrically controlled programmed shutter assembly of claim 3, including three oscillatable shutter blades mounted on said locking ring.

* * * * *